Figure 1:
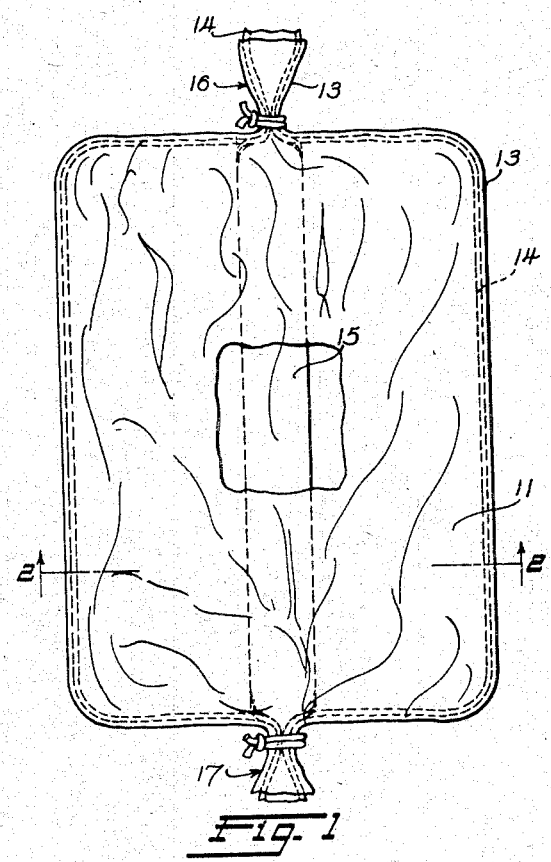

Oct. 13, 1942.  R. H. VOGT  2,298,779
MEAT PACKAGE AND METHOD
Filed May 21, 1941

Inventor
Richard H. Vogt

By Strauch & Hoffman
Attorneys

Patented Oct. 13, 1942

2,298,779

UNITED STATES PATENT OFFICE 2,298,779

MEAT PACKAGE AND METHOD

Richard H. Vogt, Philadelphia, Pa.

Application May 21, 1941, Serial No. 394,533

11 Claims. (Cl. 99—174)

The present invention relates to novel methods of preparing meats and meat products of various kinds for the market and for packaging meats and meat products, and to an improved meat package. More particularly, the invention relates to a method of packaging meat in small units capable of being sold as such to ultimate consumers, the units being encased in attractive transparent wrappers applied to the units so as to attractively display the meat and preserve its natural characteristics for relatively long periods.

It is the present practice in the meat industry to purchase live stock, such as cattle and hogs, in the areas where they are raised, place them in live stock cars and ship them while alive to a slaughter house at a somewhat distant point for butchering. This method of marketing entails very large freight charges, results in injury to the live stock and considerable loss of live stock due to their contraction of pneumonia and many other ailments in the course of shipment.

Furthermore, present slaughter house practice consists in slaughtering the live stock and carving the carcass into relatively large sections which are hung in storage rooms for ripening (autolysis) at low temperatures in a carefully controlled, humidified atmosphere. After ripening, these sections are sold to retail merchants who butcher and sell the various cuts of meat to the housewife. Usually the retail cut of meat is made at a customer's request. In addition to the expensive live stock charges and losses of healthy live stock in shipment, this method of marketing meats results in the substantial impairment of the natural flavor, color and moisture content of the meat by exposure to the air. The exposed meat is open to attack by bacteria and mold spores which are constantly present in the atmosphere.

A further disadvantage of the present meat marketing practice is that the long exposure to air forms a tough, relatively dry skin layer on the exposed surface. Upon exposure of fresh meats, fissures are known to appear in the meat surfaces and such fissures provide an ideal breeding place for bacteria and mold spores and allow the oxygen in the air to penetrate beneath said surfaces of the meat to further harmful putrefaction.

It is a primary object of this invention to eliminate the stated objections by providing a practical way of packing and preserving small units of meat or meat products for long periods, thus making it feasible to complete the butchering and packaging of the meat at the places where the live stock is available, and the transporting to the market in dressed and packaged form in units capable of ready sale as complete entities to ultimate consumers.

A further object of this invention is to provide a meat or like package having a tight fitting, airtight casing having a moisture-proof layer or lining contacting the meat whereby a meat unit having exceptional keeping qualities and an attractive appearance is provided.

Another object of this invention is to provide a process of packaging fresh meat in shrinkable casings, lined to prevent evaporation of the natural moisture and contact between the moist meat and the casings and shrinking the casings tightly around the meat and the lining to insure the preservation of the meat and to maintain the close grain surface structure normally present in unaged fresh meat.

Still another object of the invention is to provide a method of protecting freshly butchered meat from exposure to air during transportation, handling and ripening and up until the time of its actual use, thereby eliminating contamination from bacteria and mold spores present in the atmosphere, the undesired loss of natural moisture, and surface hardening incident to the exposure of unprotected meat products.

A further object of this invention is to provide a way to ripen or effect autolysis of fresh meat in the final retail wrapping and after the meat has been cut into units capable of sale to ultimate consumers.

Another object of this invention resides in packaging and sealing the fresh meat in a transparent encasement consisting of layers serving to protect the meat so as to retain and seal the essential meat juices in the package and to preserve the natural meat color and prevent darkening of the meat incident to its exposure to the air.

A still further object of this invention is to provide an article of manufacture comprising a novel and attractive package for the preservation and sale of fresh meat products in sizes suitable for retail sales, the covering for said package exposing the meat product to the view of customers, but being capable of preventing access of the atmosphere thus preserving the contained fresh meat product for a considerable period of time at ordinary refrigerating temperatures.

The invention also aims to provide a method of packaging a meat product including the step of shrinking a cellulosic casing having a high degree of contractability around the product after the latter has been encased in a moisture-proof layer that prevents contact of the naturally moist meat with said casing.

Figure 2:
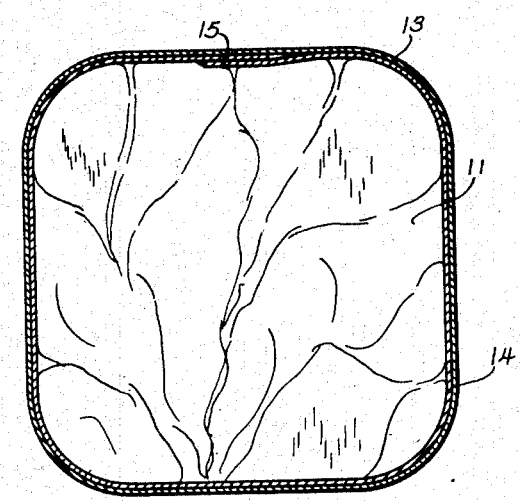

Further objects will appear from the following description when read in conjunction with the appended claims and attached drawing wherein:

Figure 1 is an elevational view of a preferred embodiment of a meat package formed in accordance with the present invention, and having portions of the casing broken away to show the lining interposed between the meat and the casing, and Figure 2 is a transverse sectional view taken on line 2—2 of Figure 1.

Freshly killed meat has a natural close grain surface free of fissures and open pores. After exposure to the atmosphere, fissures and open pores appear in said surface in which harmful bacteria or mold spores present in the air may collect and propagate.

By following the procedure about to be described it is possible to maintain this natural homogeneous surface quality of freshly killed meat thus reducing the possibility of spoilage of meat.

In early attempts to preserve this close grain structure of meat and eliminate the disadvantages of the present marketing methods, applicant pressed freshly butchered meat tightly into heavy glass containers and placed sealed covers on the containers. While this form of invention was successful in preserving the meat, it was too expensive for commercial use and the containers were subject to breakage with the result that splinters of glass were likely to find their way into the meat. This attempt, accordingly, was dropped.

Applicant then attempted to package the freshly cut meat in highly shrinkable cellulose casings of the kind used widely as artificial sausage casings. It was found that a highly attractive package resulted when the casing was first shrunk on the fresh meat and that air was substantially excluded and the natural smooth meat surface was preserved. However, tests showed that the casing became loose after storage of the package. Furthermore, it was found that the casings were not impervious to the atmosphere and after a time spoilage of the meat began and the undesired fissures and pores appeared in the meat surface and discoloration occurred. This type of package was accordingly dropped.

After extensive experiments, it was finally discovered that the moisture present in the meat restricted the natural inherent shrinking effect of the casings and that the gradual permeation of air through the more or less porous casings resulted in the deterioration of the meat.

The present invention overcomes the difficulties just described and results in a meat package that has surprising keeping qualities at ordinary keeping temperatures, that has an attractive appearance after long periods of storage, in which the outer casing remains taut, and in which there is an absence of surface discoloration and the development of surface fissures and pores in the meat surface even after relatively long periods of time that are needed to transport meat packages from a distant packing house through the hands of retailers and into the home where the meat is consumed.

The invention is preferably practiced as follows:

The cattle, pig, sheep or other animal is slaughtered and the carcass is preferably immediately carved or butchered at the packing house. The individual cuts are preferably sized, and trimmed when necessary, to suit the demands of the ultimate consumer.

The butchered cuts of the meat 11, preferably while in a soft, moldable condition, are first completely encased in a waterproof and moistureproof wrapper 14. The wrapped cuts are then placed or preferably stuffed in a casing or container 13, or the wrapper 14 may be inserted as a liner in the casing 13 and the meat then forced into the lined casing.

Casing 13 is preferably formed of transparent cellulosic material customarily used as artificial sausage casings. A suitable casing is obtainable on the open market under the name "Visking." These casings are highly shrinkable if applied to the meat and saturated with water and then heated to dry after the wrapped meat has been inserted in the casing. Lining 14 preferably takes the form of a separate cellulose sheet treated to render it impervious to moisture and is coextensive with the ends of casing 13 and has its longitudinal edges disposed in overlapping relation as shown at 15 to assure complete isolation of meat 11 and casing 13. Transparent waterproof "Cellophane," available on the market is a satisfactory material for wrapper 14.

The wrapped meat 11, being soft, is readily forced into casing 13 and can be made to completely fill the casing and expel the air therefrom. End 16 is preferably closed and sealed in well known manner to exclude the air and the package is dipped in water or moistened in any suitable manner. The moist package is then suspended by end 16 and subjected to a blast of hot air to cause a preliminary shrinking of casing 13 around lining 14 and meat 11 to compress the soft meat. This contraction removes the excess moisture from the meat and since end 17 is open the moisture drains from the open end 17. After a short time, end 17 is closed and sealed and casing 13 is subjected to further blasts of hot air to complete the shrinking of casing 13. Since the meat is soft and of a homogeneous nature when packed, this shrinkage contracts the meat and provides a firm, dense package containing the natural meat juices and substantially no trapped air.

While the packing of the meat cuts while still warm and plastic is preferred, it will be understood that meats which have lost their natural heat, and some of their plasticity, may be wrapped in a waterproof wrapper, preferably transparent "Cellophane" and then stuffed or forced into the shrinkable outer casing.

The moisture-proof wrapper or layer 14 serves to segregate the moist meat from contact with the outer casing 13. Accordingly, when said casing is dried, it is thoroughly or completely dried and it has been noted that it shrinks to a far greater degree than is possible of accomplishment when the inside of casing 13 is in contact with the moist meat. The increased shrinkage of casing 13 results in the exertion of considerable pressure on the wrapped meat, ironing out all wrinkles in the wrapper, and resulting in a package having a smooth taut outer covering of very attractive appearance. The tautness of the outer cover 13 is not lost even after storage of the package for periods exceeding a month's time, and air does not penetrate the composite encasement of the meat sufficiently to alter its natural surface appearance after a similar period of time. And tests have shown that the quality of the encased meat is preserved for long periods.

For a side of beef dressed on hook, about 300 pounds, it has been found that about 76 casings of the following size are required: 10 holding 6 pounds; 20 holding 4 pounds; and 46 holding 2 pounds. The sealed packages containing the cuts of meat of known weight are then placed in storage until used.

It has been found that meat packed in this manner ripens properly and is not adversely affected by relatively high storage temperatures. However, unduly high temperatures in the storage room are not recommended and the temperature is preferably maintained at approximately 42 degrees Fahrenheit. Packaging in this manner is particularly desirable since it enables planned deliveries of the packaged meat, particularly when the meat is to be shipped from the live stock centers to ultimate consumers at distant points.

Furthermore, the air in the storage room need not be humidified. This follows since the packages are substantially air-tight and wholly moisture-proof and there is no danger of undesired drying of the meat and consequent shrinkage and loss of weight. The elimination of the need for humidifying the air, accordingly, materially simplifies the problem of storage and effects a considerable saving in plant operating expenses.

In view of the fact that higher storage temperatures may be used for ripening, autolysis can, if desired, be effected in a shorter time than is possible under present practice. As a consequence, the storage space can be materially reduced without decreasing the daily output of the plant.

Further desirable results flowing from the prompt air-tight packaging of the meat are (1) the elimination of high freight charges incident to shipment of live-stock and the loss of stock due to sickness contracted in transit; (2) the elimination of the undesired fissures and open pores because of the homogeneous nature of the package due to the shrinkage of casing 13; (3) the retention of the full natural meat flavor by eliminating the losses due to evaporation and drippage incident to hanging the meat in the air for ripening; (4) the prompt sealing of the meat against contact with harmful bacteria and mold spores always present in the air; (5) the elimination of the surface hardening and discoloration of the meat incident to exposure to the air; (6) the elimination of the rancidity of the fat brought about by exposure to the air; and (7) the elimination of the so-called "Piney" or "salesbox-sawdust" taste now frequently associated with fresh meats.

To obtain the full advantage of the present packaging and handling method, the invention contemplates the retail selling of the sealed packages to the ultimate user, the housewife. In this connection, the packaged meat, after ripening, is sold to the retail merchant in varying sizes, cuts and shapes to contain varying weights of the different cuts of meat. Either a single cut as a roast or a series of cuts such as chops may be packaged. The weight of the meat in each casing will be suitably shown on the casing; preferably by printing the nature of the particular cut, the weight, the manufacturer's name and the date of packing on the casing.

By retaining the meat in the sealed container until ultimate use, further material advantages of primary concern to the housewife result. In this connection, the housewife knows (1) that she is purchasing an article which has not been exposed to dust and contamination from the air or actual contact with the hands of the truckers or retail merchants; (2) that she is purchasing an article which has not been dried by the air and as a consequence retains its natural flavor and all natural ingredients; (3) that the article purchased may be kept in her home refrigerator for several days without any danger of spoiling; (4) that the article purchased is produced by the designated packer; (5) and if the label bears the date of packing, that she is not buying meat which has been in the stock of the retail merchant an undue length of time.

In connection with the protection against spoilage, actual experience has shown that meat packed and ripened in accordance with this invention and placed in a refrigerator of the home type will retain its natural bright color and moisture even though kept for 40 days. The same meat kept in the same refrigerator but ripened in the usual manner and wrapped in ordinary paper was entirely unfit for consumption after about 4 days. While no attempt has been made up to the present time to determine the maximum length of time that products will keep when packed in accordance with this invention, the above illustration sufficiently indicates the real advance in the art made by this invention.

While the present invention is particularly useful in the marketing and packaging of fresh meats, it is equally as well adapted for packaging liver sausage, ham loaves, bologna and the like to provide a package of exceptional keeping qualities.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A meat package comprising a quantity of meat customarily purchased by the ultimate consumer, a moisture-proof liner completely surrounding said quantity of meat and adapted to prevent evaporation of the natural juices and penetration of the moisture normally present in the meat to the outer surface of said liner and a cellulose casing separate from the liner tightly shrunk around said liner and said meat to retain said liner in place and compress the meat whereby a firm, attractive package is provided.

2. A meat package comprising a quantity of meat customarily purchased by the ultimate consumer and a cellulose casing tightly shrunk around said quantity of meat to compress the meat and provide a firm, attractive package, said casing having moisture-proof means separate from the casing interposed between it and the meat to prevent evaporation of the natural moisture of the meat and protect the casing from the natural moisture whereby undesired loosening of the casing and deterioration of the package is obviated.

3. The step in a method of packaging meat products consisting in the interposition of a separate completely encasing waterproof layer between the product and the outer artificial cellulosic shrinkable encasement for said product.

4. A meat product encased in an artificial casing shrunk on the meat to snugly embrace said product and having a complete barrier layer between said casing and the meat preventing the passage of moisture or air to or from said meat, said layer being independent of and free of attachment to said casing.

5. A method of preparing and packaging meat for retail sale comprising the steps of inserting a separate moisture-proof liner into an ordinary moistened cellulose casing, forcing meat into the lined casing to completely fill the casing, drying the casing and causing it to shrink independently of the liner and compress the contained meat into a firm homogeneous mass free of fissures and open pores and form a firm package of lasting keeping qualities.

6. A method of preparing and packaging fresh meat for the market comprising the steps of butchering a carcass into retail cuts of meat at the slaughter house, placing the retail cut of meat in a moistened cellulose casing having a moisture-proof lining separate from the casing so that the lining completely covers the meat at all points, and then drying the casing to shrink it tightly around the meat independently of the lining and meat and provide a firm package of attractive appearance and lasting keeping qualities.

7. A method of preparing and packaging fresh meat for retail sale comprising butchering the meat into retail cuts, placing said cuts in a moistened cellulose casing having a moisture-proof lining separate from the casing and completely isolating said casing from the meat, tying the ends of said casing to close the casing and exclude the air, drying the casing to assure complete shrinkage of said casing around said meat whereby said meat is tightly compressed and a firm package of lasting keeping qualities and attractive appearance is provided.

8. A meat package adapted for retail sales comprising a cut of meat customarily purchased by the ultimate consumer, a moisture-proof transparent liner completely surrounding said meat and adapted to prevent evaporation of the natural meat juices and moisture and penetration of the natural moisture to the outside of said package and a transparent cellulosic casing separate from said liner tightly shrunk around said liner and said meat to retain said liner in place and compress the meat whereby a firm package of lasting keeping qualities and attractive appearance is provided.

9. An article of manufacture, comprising a transparent cellulose container of a size and shape suitable for receiving meat in a quantity frequently purchased by the ultimate consumers, a lining of transparent moisture-proof lining separate from said container disposed within said container in contact with the interior of said casing, a selected cut or cuts of fresh meat containing the natural juices and moisture completely filling said container, said container being tightly shrunk around said liner and said meat to retain the liner in place and form a firm package free of surface moisture and of lasting keeping qualities.

10. A meat or like product having an inner complete envelope of moisture-proof transparent material, and an outer substantially complete envelope of transparent cellulosic material separate from said envelope tautly shrunk about said inner envelope.

11. The method of shrinking a moistened artificial cellulosic casing into lasting snug engagement with a meat product, which includes the interposition of a moisture-proof barrier layer separate from the casing between the product and the casing, then drying the casing while it is protected from contact with the naturally moist meat product by said layer, whereby said casing may dry without interference due to the moisture in said product and shrink independently of said layer.

RICHARD H. VOGT.